(12) United States Patent
Hsieh (10) Patent No.: US 9,983,734 B2
(45) Date of Patent: May 29, 2018

(54) DISPLAY

(71) Applicant: Incha Hsieh, Sinfon Township, Hsinchu County (TW)

(72) Inventor: Incha Hsieh, Sinfon Township, Hsinchu County (TW)

( * ) Notice: Subject to any disclaimer, the term of this patent is extended or adjusted under 35 U.S.C. 154(b) by 0 days. days.

(21) Appl. No.: 14/326,552

(22) Filed: Jul. 9, 2014

(65) Prior Publication Data

US 2015/0015543 A1    Jan. 15, 2015

(30) Foreign Application Priority Data

Jul. 15, 2013    (TW) .............................. 102125227 A (51) Int. Cl.
| | |
|---|---|
| *G06F 3/0488* | (2013.01) |
| *G06F 3/042* | (2006.01) |
| *G02F 1/1333* | (2006.01) |
| *G06F 3/041* | (2006.01) |
| *G02F 1/1362* | (2006.01) |

(52) U.S. Cl.
CPC ........ *G06F 3/0421* (2013.01); *G02F 1/13338* (2013.01); *G06F 3/042* (2013.01); *G06F 3/0412* (2013.01); *G02F 1/136209* (2013.01); *G02F 2201/40* (2013.01); *G02F 2203/11* (2013.01)

(58) Field of Classification Search
CPC .. G06F 3/04883; G06F 3/0421; G06F 3/0412; G06F 2203/04104; G06F 2203/04808; G02F 1/13338; G02F 2203/11; G02F 1/136209; G02F 2001/13312; G02F 2201/40
See application file for complete search history.

(56) References Cited

U.S. PATENT DOCUMENTS

| | | | | |
|---|---|---|---|---|
| 7,539,513 | B2* | 5/2009 | Cathey et al. ............. | 455/556.1 |
| 8,154,780 | B2* | 4/2012 | Cable et al. ...................... | 359/9 |
| 2008/0121442 | A1* | 5/2008 | Boer et al. ................. | 178/18.09 |
| 2008/0122803 | A1 | 5/2008 | Izadi et al. | |

(Continued)

FOREIGN PATENT DOCUMENTS

| | | |
|---|---|---|
| CN | 101762899 A | 6/2010 |
| JP | 2009223896 A | 10/2009 |

(Continued)

OTHER PUBLICATIONS

European Search Report issued in corresponding EP14176756.6-1904 dated Nov. 5, 2014 (8 pages).

(Continued)

*Primary Examiner* — Christopher E Leiby
(74) *Attorney, Agent, or Firm* — Trop Pruner & Hu, P.C.

(57) ABSTRACT

A display includes a first substrate, a second substrate, a photo-sensing unit, and a backlight unit. The first substrate includes intersecting data lines and scan lines. The first substrate has pixel zones, each being defined by an adjacent two of the data lines and an adjacent two of the scan lines. The second substrate includes a black matrix and defines light-transmissible zones allowing transmission of visible light therethrough. The black matrix allows transmission of infrared light therethrough and blocks transmission of visible light therethrough. The photo-sensing unit is disposed on the first substrate and includes infrared sensors and a photo switch coupled to the infrared sensors.

14 Claims, 7 Drawing Sheets

(56) References Cited

U.S. PATENT DOCUMENTS

| | | | |
|---|---|---|---|
| 2010/0164906 A1 | 7/2010 | Fukunaga et al. | |
| 2010/0283765 A1 | 11/2010 | Gotoh et al. | |
| 2010/0321341 A1* | 12/2010 | Cho et al. | 345/175 |
| 2011/0128428 A1* | 6/2011 | Takatoku et al. | 348/307 |
| 2013/0201429 A1* | 8/2013 | Xu | G02F 1/133512 349/95 |
| 2014/0267955 A1* | 9/2014 | Hibayashi | G06F 3/0412 349/12 |
| 2016/0103359 A1* | 4/2016 | Kimura | G02B 5/201 349/33 |

FOREIGN PATENT DOCUMENTS

| | | |
|---|---|---|
| JP | 2011135561 A | 7/2011 |
| JP | 2012518228 A | 8/2012 |
| TW | 200941087 | 10/2009 |
| TW | 201119021 A1 | 6/2011 |
| TW | 201122948 A1 | 7/2011 |
| TW | 201250355 A1 | 12/2012 |
| WO | 2009110293 A1 | 9/2009 |

OTHER PUBLICATIONS

Taiwan Search Report issued in corresponding TW102125227 dated Aug. 5, 2014 (2 pages).
CN Search report in corresponding patent application CN2014100663705 dated Apr. 25, 2016 (4 pages).

\* cited by examiner

| R | G | B | W |
|---|---|---|---|
| R | G | B | W |
| R | G | B | W |

FIG.9

| R | G | R | G |
|---|---|---|---|
| B | W | B | W |
| R | G | R | G |
| B | W | B | W |

DISPLAY

CROSS-REFERENCE TO RELATED APPLICATION

This application claims priority of Taiwanese Patent Application No. 102125227, filed on Jul. 15, 2013.

BACKGROUND OF THE INVENTION

1. Field of the Invention

The invention relates to a display, more particularly to a multi-functional display.

2. Description of the Related Art

When conventional displays are desired to be incorporated with gesture sensing/control functions, an add-on gesture sensor is required in order to perform such functions. For example, by plugging in an external gesture sensor, which includes a visible light camera, an infrared light source, and an infrared light detector to detect the infrared light generated by the infrared light source and reflected by an operator's gesture, the gesture sensing/controlling functions can thus be performed.

However, such configuration is not convenient and requires the external gesture sensor. Therefore, US Patent Application Publication No. 20100045811 discloses a conventional display, wherein infrared sensors are directly formed at pixel areas thereof, so that the add-on gesture sensors can be omitted. Nevertheless, the internal infrared sensors occupy the pixel areas and inevitably lower the aperture ratio of the conventional display.

SUMMARY OF THE INVENTION

Therefore, the object of the present invention is to provide a display that can provide the infrared light-sensing function without lowering the aperture ratio thereof.

Accordingly, a display of the present invention includes a first substrate, a second substrate, a photo-sensing unit, and a backlight unit.

The first substrate includes a plurality of scan lines arranged along a first direction, and a plurality of data lines arranged along a second direction and intersecting the scan lines. The first substrate has a plurality of pixel zones each of which is cooperatively defined by an adjacent two of the data lines and an adjacent two of the scan lines.

The second substrate is spaced apart from the first substrate and includes a black matrix. The black matrix configures the second substrate with a plurality of spaced-apart light-transmissible zones that correspond in position to the pixel zones and that allow transmission of visible light therethrough. The black matrix is configured to allow transmission of infrared light therethrough and to block transmission of visible light therethrough.

The photo-sensing unit is disposed on the first substrate at a position corresponding to the black matrix of the second substrate, and includes a plurality of infrared sensors and a first photo switch electrically coupled to the infrared sensors.

The backlight unit serves as a light source for image display.

Preferably, the second substrate includes a plurality of color filters disposed at the light-transmissible zones. Each of the color filters is configured to allow transmission of one of red light, green light, and blue light therethrough.

Preferably, the display further includes a light generating unit serving as a light source for detection by the photo-sensing unit. More preferably, the light generating unit is operable to generate infrared light. Even more preferably, the light generating unit includes an infrared light-source and a lens component.

Preferably, the display further includes a micro-projector that is coupled to one of the first and second substrates and that is operable for projecting images. More preferably, the micro-projector is rotatably coupled to one of the first and second substrates.

Preferably, the backlight unit includes a light guide plate and a backlight source that is operatively associated with the light guide plate and that is selected from a white light-emitting diode (LED), a red LED, a green LED, a blue LED, and a far infrared LED.

Preferably, the first substrate includes a plurality of second photo switches, each of which is associated with a respective one of the pixel zones to control an applied voltage to the respective one of the pixel zones.

Preferably, the first photo switch and the second photo switches are independently one of an indium-gallium-zinc-oxide transistor, a poly-silicon transistor, and an amorphous silicon transistor.

Preferably, each of the infrared sensors is a photodiode made of a material selected from the group consisting of an amorphous silicon semiconductor material, a micro-crystalline silicon semiconductor material, a poly-crystalline silicon semiconductor material, an organic material having a band gap less than 1.12 eV, and an inorganic material having a band gap less than 1.12 eV.

Preferably, the photo-sensing unit further includes an amplifier operable for adjusting an output current of a corresponding one of the infrared sensors.

Preferably, the display is configured as one of a liquid crystal display, an organic light-emitting diode (OLED) display, and an electro-wetting display.

Preferably, the display further includes an X-ray sensing unit that is coupled to the first substrate, that corresponds in position to the color filters which allow transmission of green light, and that includes a plurality of scintillators operable to convert X-ray light into visible light, and a plurality of thin-film transistors operable to convert the visible light from the scintillators into electrical signals.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Referring to FIGS. 1 to 10, the first preferred embodiment of a display according to the present invention is shown to include a first substrate 21, a second substrate 22, a photo-sensing unit 23, a light generating unit 24, and a backlight unit 25.

Figure 1:
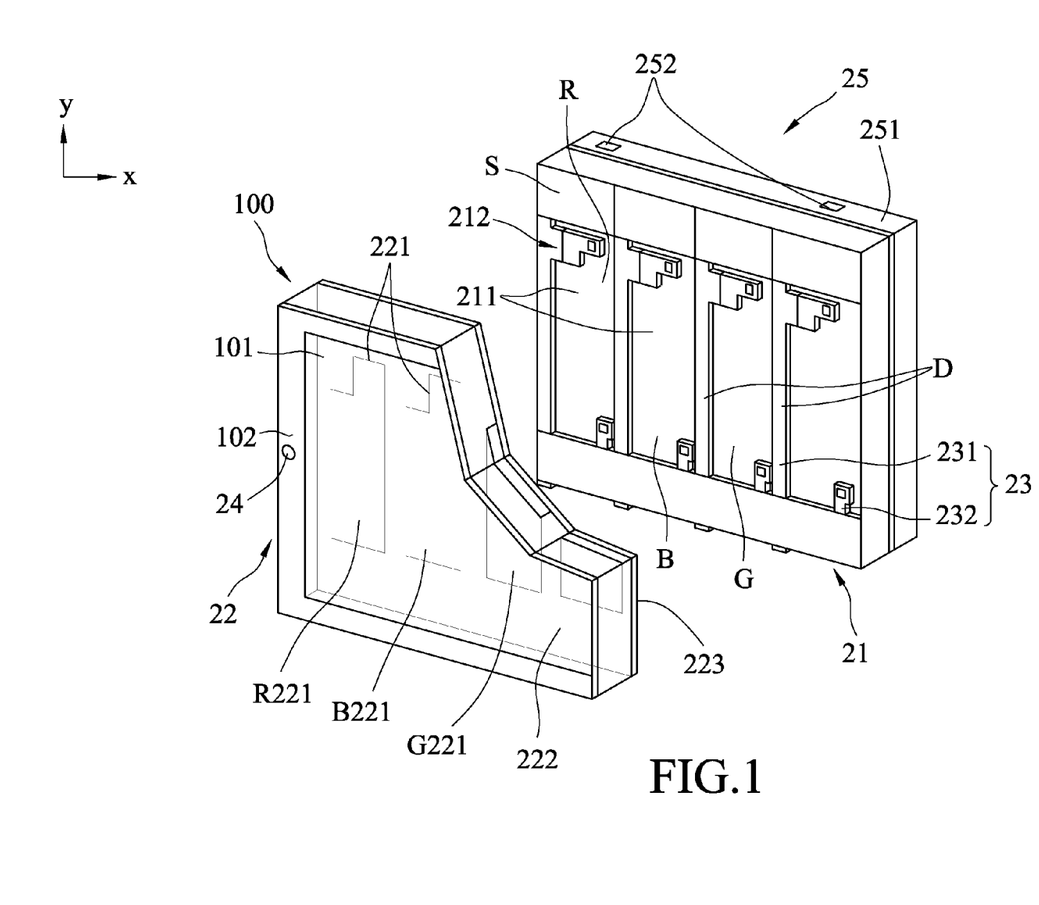
FIG. 1 is a fragmentary partly cutaway schematic perspective view of a first preferred embodiment of a display according to the invention.

As shown in FIG. 1, the first substrate 21 includes a plurality of scan lines (S) arranged in a first direction (X), a plurality of data lines (D) arranged in a second direction (Y) and intersecting the scan lines (S), and a plurality of pixel zones cooperatively defined by an adjacent two of the scan lines (S) and an adjacent two of the data lines (D). Each of the pixel zones is provided with a pixel electrode 211 formed on the first substrate 21, and a second photo switch 212. The second photo switch 212 associated with a respective one of the pixel zones is operable to control an applied voltage to the respective one of the pixel zones via a respective one of the pixel electrodes 211.

As shown in FIG. 1, the second substrate 22 is spaced apart from the first substrate 21 and has a display surface 100 defining a display zone 101 and a frame zone 102 surrounding the display zone 101. The second substrate 22 includes a common electrode 223 and a black matrix 222 which configures the second substrate 22 with a plurality of spaced-apart light-transmissible zones 221. The black matrix 222 is configured to allow transmission of infrared light therethrough and to block transmission of visible light therethrough. The light-transmissible zones 221 correspond in position to the pixel zones of the first substrate 21 and allow transmission of visible light therethrough. In this embodiment, the second substrate further includes a plurality of color filters disposed respectively at the light-transmissible zones 221 and including red light filters (R221) configured to allow transmission of red light therethrough, green light filters (G221) configured to allow transmission of green light therethrough, and blue light filters (B221) configured to allow transmission of blue light therethrough. The common electrode 223 covers the black matrix 222 and the color filters.

In general, the pixel zones of the first substrate 21 corresponding to the red light filters (R221) are defined as red pixels (R), the pixel zones corresponding to the green light filters (G221) are defined as green pixels (G), and the pixel zones corresponding to the blue light filters (B221) are defined as blue pixels (B).

It should be noted that the display of the preferred embodiments are exemplified as a liquid crystal display (LCD), and liquid crystal molecules are filled between the first and second substrates 21, 22. However, the display of the present invention is not limited to be configured as the LCD, and it can be configured as an organic LED display, as well as an electro-wetting display, and should not be limited to what is disclosed in this embodiment.

Figure 2:
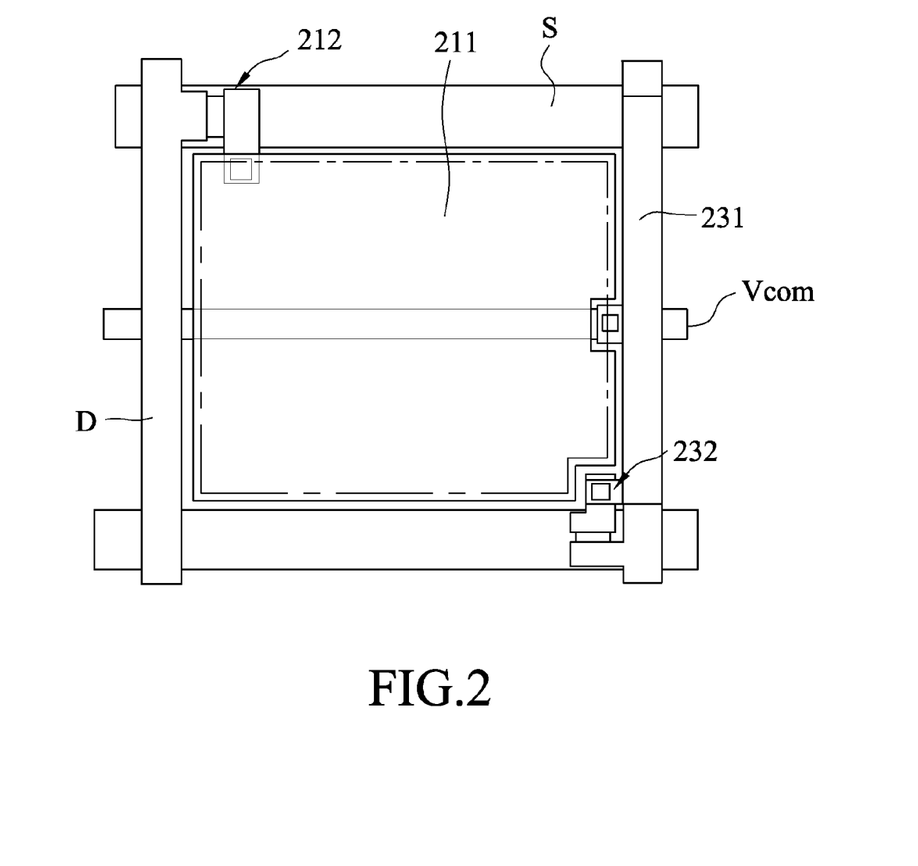
FIG. 2 is a fragmentary schematic view of the first preferred embodiment, illustrating a layout structure of a first substrate.
Figure 3:
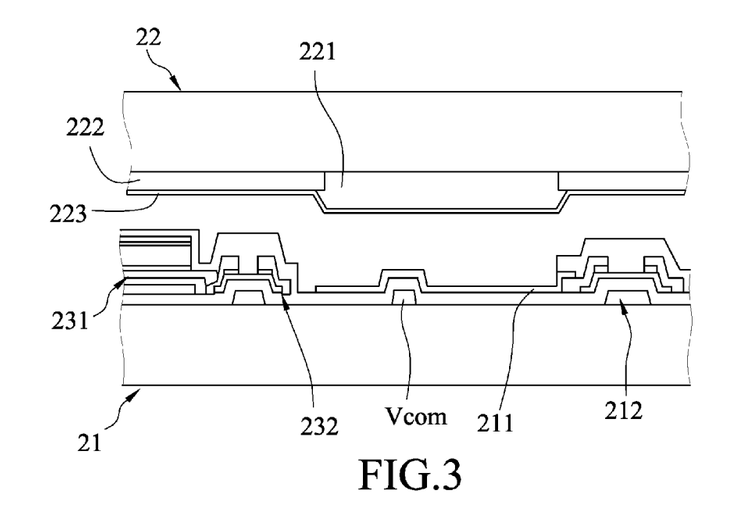
FIG. 3 is a fragmentary schematic view of the first preferred embodiment.
Figure 4:
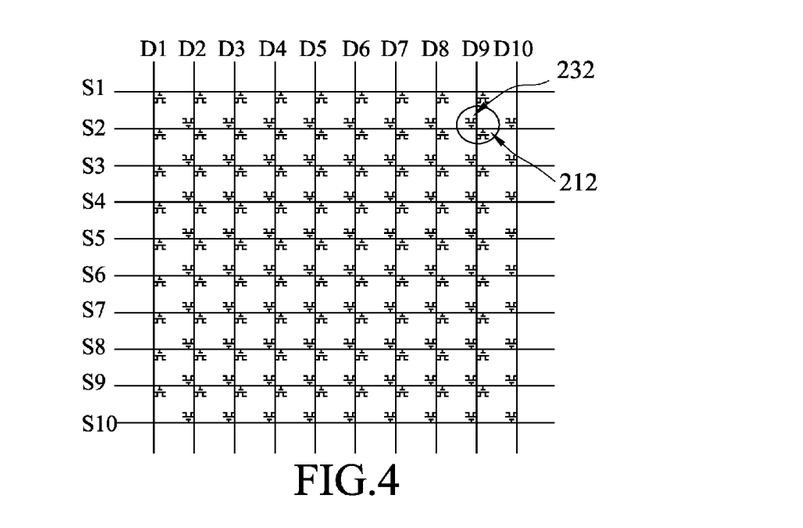
FIG. 4 is a schematic circuit diagram of the first preferred embodiment.

The photo-sensing unit 23 is disposed on the data lines (D) or on the scan lines (S) of the first substrate 21 and at a position corresponding to the black matrix 222 of the second substrate 22. To be specific, as shown in FIG. 2, a depicted central area of the first substrate 21, which is defined by phantom lines, corresponds in position to one of the light-transmissive zones 221 of the second substrate 22. Excluded from the central area, a margin area, where the data lines (D) and the scan lines (S) are located, corresponds in position to the black matrix 222 of the second substrate 22. In this embodiment, the photo-sensing unit 23 includes a plurality of infrared sensors 231 and a plurality of first photo switches 232 coupled to the infrared sensors 231, respectively. The infrared sensors 231 are operable to receive infrared light, which passes through the black matrix 222 of the second substrate 22, so as to generate photo-currents. The photo-currents from the infrared sensors 231 can thus be converted into electrical signals by the first photo switches 232, respectively.

Generally, the infrared sensors 231 can be photodiodes or phototransistors, and the first and second photo switches 232, 212 can be thin film transistors (TFTs). Preferably, the first and second photo switches 232, 212 can independently be indium-gallium-zinc-oxide (IGZO) transistors, polycrystalline silicon (Poly-Si) transistors, or amorphous silicon (a-Si) transistors. Preferably, each of the infrared sensors 231 is a photodiode made of a material selected from the group consisting of an a-Si semiconductor material, a microcrystalline silicon semiconductor material, a Poly-Si semiconductor material, an organic material having a band gap less than 1.12 eV, and an inorganic material having a band gap less than 1.12 eV (such as HgCdTe). It should be noted that, when the infrared sensors 231 are desired to have effective sensitivity for light having a wavelength of 950 nm or greater, the infrared sensors 231 are preferably photodiodes made of the organic material or inorganic material having a band gap less than 1.12 eV (such as HgCdTe), since silicon-based photodiodes have relatively low sensitivity for the light having a wavelength of 950 nm or greater.

It is worth noting that, as shown in FIG. 2, the pixel electrodes 211 may share common source lines (Vcom) with the photo-sensing unit 23. However, in other embodiments, the pixel electrodes 211 may be coupled to one set of the common source lines (Vcom) and the photo-sensing unit 23 may be coupled to another set of common source lines (Vcom) different from those of the pixel electrodes 211.

It is worth noting that each of the first photo switches 232 may share a single scan line (S) and a single data line (D) with the second photo switch 212 associated with a common one of the pixel zones. In this case, the first photo switches 232 and the second photo switches 212 can be various types of TFTs, such as n-type TFTs and p-type TFTs, so as to prevent interference of reading and writing processes. For example, as shown FIG. 4, when one of the scan lines (S2) and one of the data lines (D9) are selected, a N-type TFT and a P-type TFT, which respectively serve as the first and second photo switches 232, 212 associated with the respective one of the pixel zones, will be alternately conducted. That is, during positive half cycles of an alternating scan voltage applied to the scan line (S2), the P-type TFT (i.e., the second photo switch 212) does not conduct and the n-type TFT (the first photo switch 232) conducts to thereby allow the data line (D9) to read sensor signals (e.g., the photo-currents) generated by the corresponding infrared sensor 231. On the other hand, during negative half cycles of the alternating scan voltage, the N-type TFT does not conduct and the P-type TFT conducts to thereby allow the data line (D9) to write in the corresponding pixel electrode 211 a pixel voltage. In such configuration, Poly-Si TFTs are preferred since Poly-Si exhibits relatively high carrier mobility and is suitable for circuit patterns having a relatively small line width.

Alternatively, each of the first photo switches 232 and the second photo switch 212 associated with a common one of the pixel zones may be independently coupled to various scan lines (S) or various data lines (D).

Figure 5:
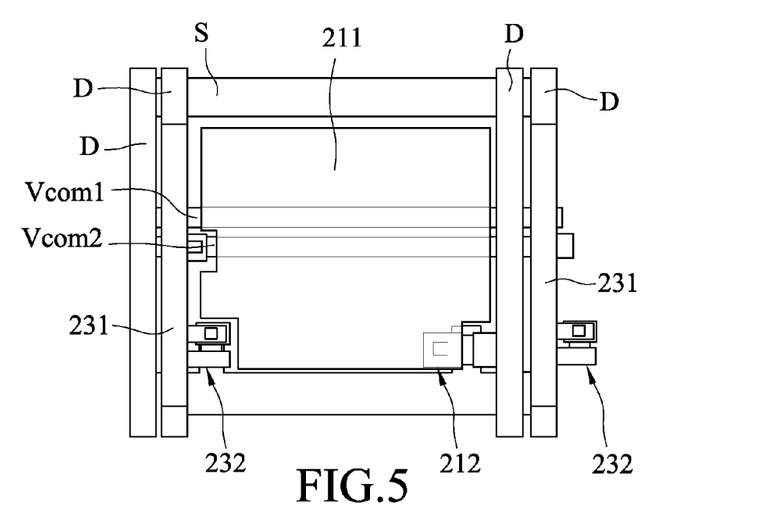
FIG. 5 is a fragmentary schematic view of a variation of the first preferred embodiment, illustrating the layout structure of the second substrate.

FIG. 5 illustrates a variation of the first preferred embodiment of the display, wherein the first photo switch 232 shares a single common scan line (S) with the second photo switch 212 associated with the common one of the pixel zones, while being coupled to a different data line (D). In addition, as shown in FIG. 5, the pixel electrode 211 is coupled to a first common source line (Vcom1) and the photo-sensing unit 23 is coupled to a second common source line (Vcom2) different from that of the pixel electrode 211.

Figure 6:
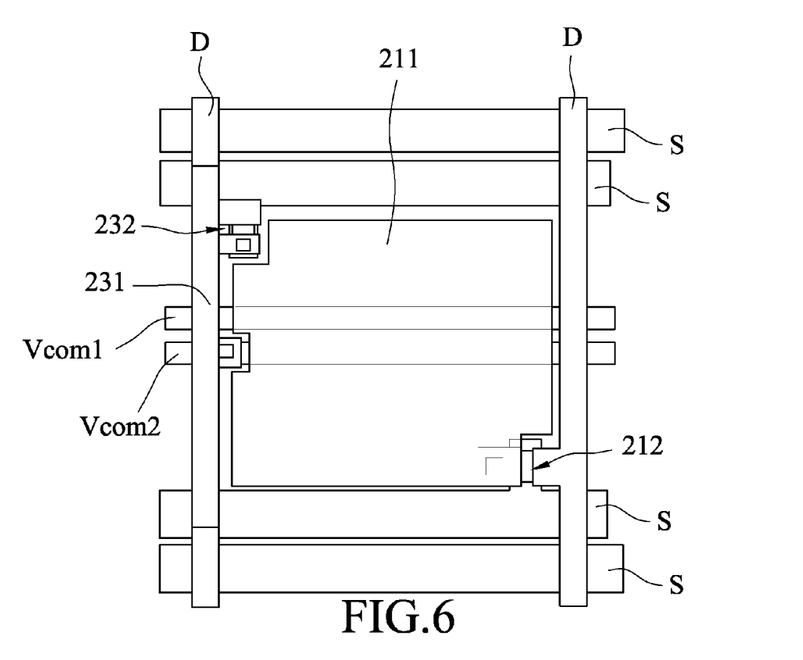
FIG. 6 is a fragmentary schematic view of another variation of the first preferred embodiment, illustrating the layout structure of the second substrate.

As shown in FIG. 6, another variation of the first preferred embodiment of the display according to the present invention is disclosed, wherein the first photo switch 232 shares a single common data line (D) with the second photo switch 212 associated with the common one of the pixel zones, while being coupled to a different scan line (S). In addition, the pixel electrode 211 is coupled to the first common source line (Vcom1) and the photo-sensing unit 23 is coupled to the second common source line (Vcom2) different from that of the pixel electrode 211.

Figure 7:
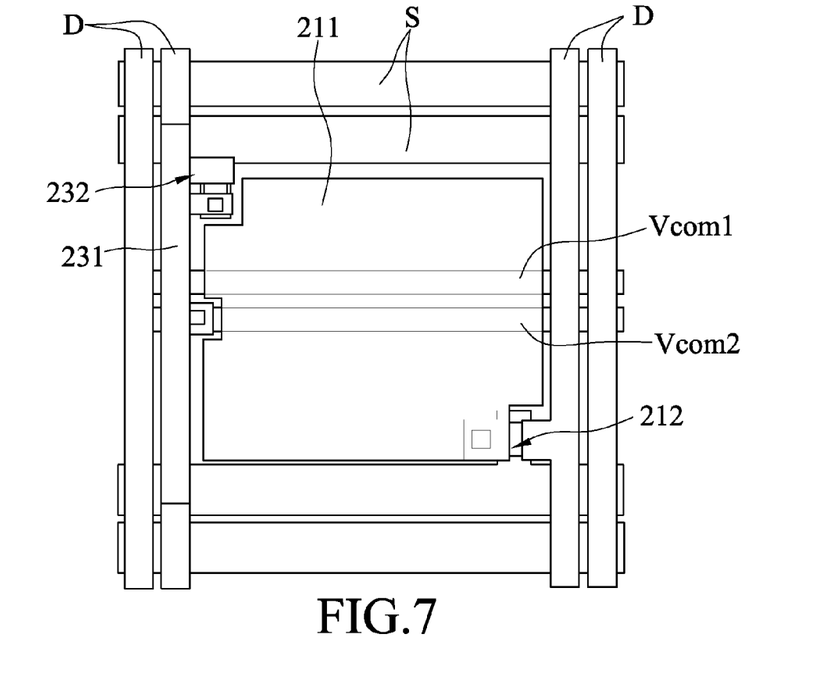
FIG. 7 is a fragmentary schematic view of yet another variation of the first preferred embodiment, illustrating the layout structure of the second substrate.

As shown in FIG. 7, yet another variation of the first preferred embodiment of the display according to the present invention is disclosed, wherein the first photo switch 232 does not share a single common data line (D) and a single common data line (S) with the second photo switch 212 associated with the common one of the pixel zones. The pixel electrode 211 is coupled to the first common source line (Vcom1) and the photo-sensing unit 23 is coupled to the second common source line (Vcom2) different from that of the pixel electrode 211. In this case, types of the first photo switch 232 and the second photo switch 212 are not limited (i.e., can be both N-type TFTs or both P-type TFTs, or can be different). Such configuration of using independent scan lines (S) and data lines (D) allows independent operations of the reading processes associated with the infrared sensors 231 and the writing processes associated with the pixel electrodes 211. Such configuration is suitable for devices having relatively large dimensions, and amorphous silicon (a-Si) TFTs are preferred.

It should be noted that locations and the number of the infrared sensors 231 are adjustable based on size or sensitivity requirement of the display. For example, the infrared sensors 231 can be formed on the scan lines (S) or on the data lines (D) located on one side of each of the pixels, or in configurations to surround each of one type of the pixels (such as the red pixels (R)), two adjacent pixels (such as a set of one of the red pixels (R) and an adjacent one of the green pixels (G)), or three adjacent pixels (such as one of the red pixels (R), an adjacent one of the green pixels (G) and an adjacent one of the blue pixels (B)). Since the data lines (D) and the scan lines (S) correspond in position to the black matrix 222, the layout area of the infrared sensors 231 can be increased without adversely affecting the aperture ratio of the display.

Figure 8:
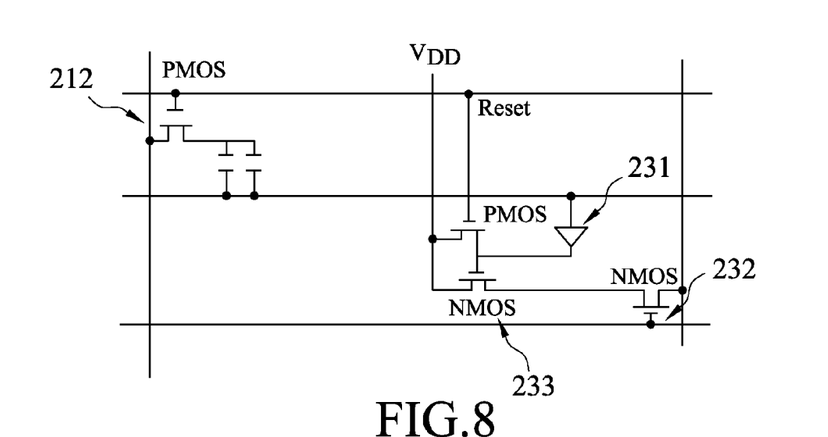
FIG. 8 is a schematic circuit diagram of yet another variation of the first preferred embodiment, illustrating that the second substrate includes an amplifier.

It should be noted that when the display has relatively large dimensions or the frequency of driving signals is relatively high (e.g., 60 Hz), the photo-sensing unit 23 of the display according to the present invention can further include a plurality of amplifiers 233 operable for adjusting an output current of a corresponding one of the infrared sensors 231, so as to increase a signal-to-noise ratio of the infrared sensors 231 (see FIG. 8). The amplifiers 233 can be TFTs similar to those of the first and second photo switches 232, 212.

The light generating unit 24 is disposed at a position corresponding to the frame zone 102 and can be coupled to one of the first and second substrates 21, 22. In this embodiment, the light-generating unit serves as a light source for detection by the photo-sensing unit 23 and includes an infrared-light source and a lens component. The infrared light from the infrared-light source via the lens component is reflected by objects and then passes through the black matrix 222 to be received by the infrared sensors 231, so as to generate the sensor signals. The infrared-light source can be an infrared LED or an infrared laser.

The backlight unit 25 is disposed at a side of the first substrate 21 opposite to the second substrate 22 and serves as a light source for image display. In this embodiment, as shown in FIG. 1, the backlight unit 25 includes a light guide plate 251 and a plurality of light sources 252 that are disposed on sides or surfaces of the light guide plate 251 and that are operatively associated with the light plate 251. In this embodiment, each of the light sources 252 can be selected from the group consisting of a white LED, a red LED, a green LED, a blue LED, and a far infrared LED. The aforesaid white, red, green or blue LEDs may contain phosphors emitting infrared light upon excitation.

By arranging the infrared sensors 231 of the photo-sensing unit 23 at positions corresponding to the black matrix 222 of the second substrate 22, the infrared-light sensing function can be built into the display and layout areas of the infrared sensors 231 can be increased without lowering the aperture ratio of the display. Moreover, sensitivity of the infrared sensors 231 is not adversely affected by the ambient light or backlight owing to the black matrix 222. Furthermore, when the infrared sensors 231 of the photo-sensing unit 23 are photodiodes (such as PIN junctions) and are disposed below the black matrix 222, the infrared sensors 231 can store electrical energy as capacitors to provide electrical power for other components of the display.

It is worth noting that the infrared sensors 231 can be configured into various sets of independent infrared cameras using software, so as to simultaneously detect multiple objects without mutual interference.

Figure 9:
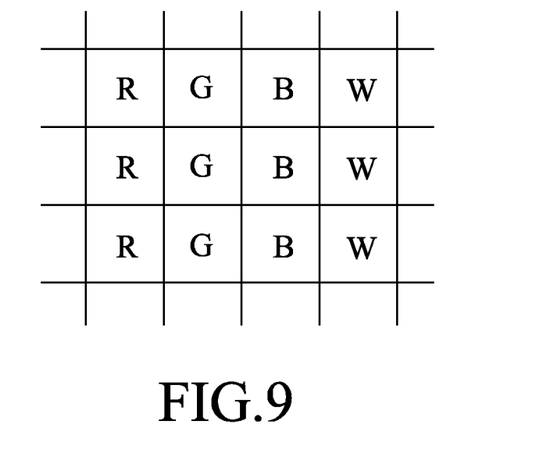
FIG. 9 is a schematic diagram of the first preferred embodiment, illustrating an arrangement of pixels.
Figure 10:
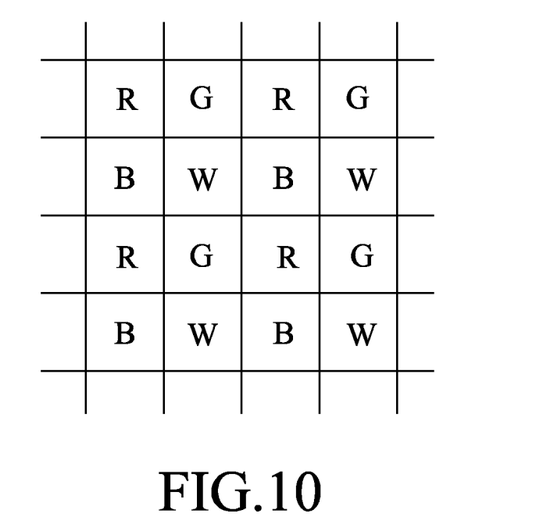
FIG. 10 is a schematic diagram of the first preferred embodiment, illustrating another arrangement of the pixels.

It is worth noting that some of the light-transmissible zones 221 of the second substrate 22 may be provided with no color filters to allow a whole spectrum of visible light to pass therethrough. Such light-transmissible zones 221 can be defined as white pixels (W) and are operable to adjust a brightness level of the display. As shown in FIGS. 9 and 10, various exemplary arrangements of the white pixels (W), the red pixels (R), the green pixels (G), and the blue pixels (B) are illustrated.

It is worth noting that the display of the present invention is not limited to be implemented as a conventional display or a gesture sensing/control display. Since the infrared sensors 231 can be arranged in accordance with the pixel zones and since the display includes the light generating unit 24 and the backlight unit 25, the display of the present invention can also be implemented as a scanner, an infrared display, or a night vision display based on demands of various fields.

It is worth noting that when the color filters are omitted from the display, the display may still perform image display function but in a grey scale configuration. In other embodiments of the present invention, photo-sensors operable to detect various colors of light may be incorporated into the corresponding pixel zones (such as red, blue, and green pixels), so as to perform color-image sensing functions.

It is also worth noting that, in this embodiment, the display may further include an X-ray sensing unit which is coupled to the first substrate, and which includes a plurality of scintillators operable to convert X-ray light into visible light, and a plurality of TFTs operable to convert the visible light from the scintillators into electrical signals. By virtue of such, the display of the present invention can be incorporated with X-ray sensing/display functions. In greater detail, the scintillators can be configured as rods that are made of a scintillation material such as CsI. Since CsI can convert X-ray into light having a wavelength substantially ranging from 520 nm to 570 nm (i.e., in a range of green light), the X-ray sensing unit can be accordingly disposed at positions corresponding to the green pixels (G) or the pixels (W) which allow transmission of light in such range of wavelength.

Figure 11:
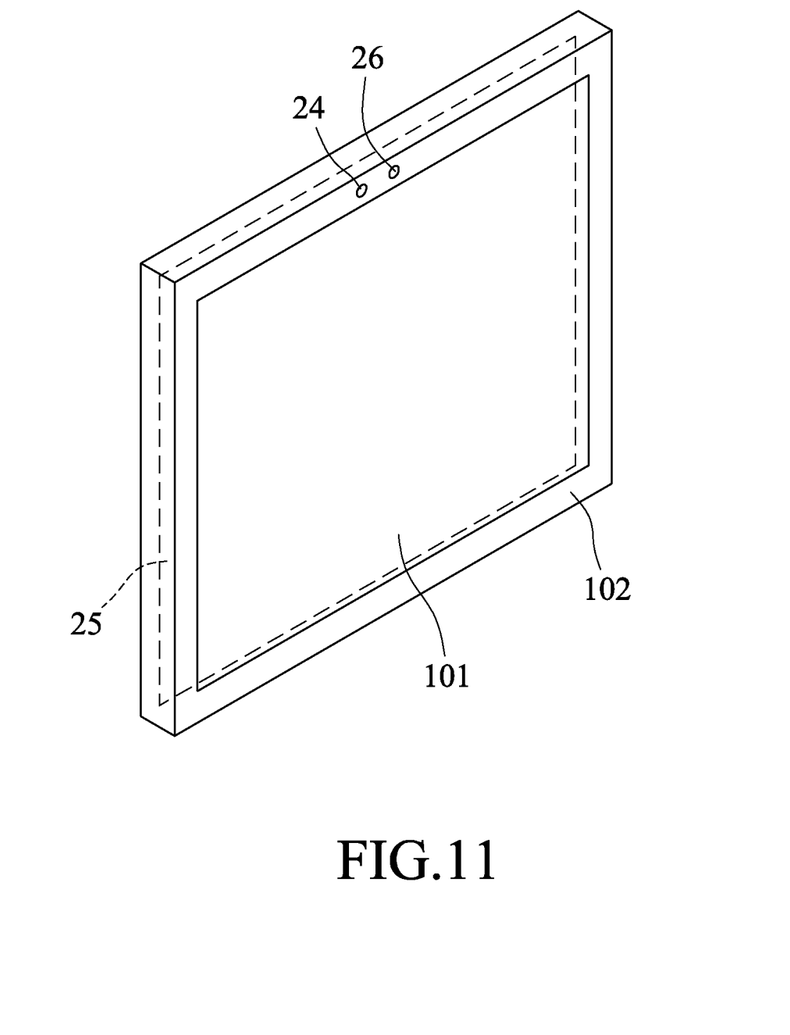
FIG. 11 is a perspective view of a second preferred embodiment of the display according to the present invention.

Referring to FIG. 11, the second preferred embodiment of the display according to the present invention is shown to be similar to that of the first preferred embodiment. The difference therebetween resides in that the display of the second preferred embodiment further includes a micro projector 26. The micro projector 26 may be coupled to one of the first and second substrates 21, 22 and is operable for projecting images. In this embodiment, the micro projector 26 is disposed at a position corresponding to the frame zone 102 of the second substrate 22. In addition, the micro projector 26 may cooperate with the photo-sensing unit 23 and the light generating unit 24 to perform the gesture sensing function. For example, as shown in FIG. 11, both of the light generating unit 24 and the micro projector 26 may be disposed on a top portion of the frame zone 102 and the micro projector 26 projects a two-dimensional image onto a surface (or a three-dimensional image), which serves as an optically projected input/control interface (like a virtual keyboard or a virtual mouse). When an object (such as a finger) performs an input movement (such as typing), the infrared light from the light generating unit 24 is reflected by the gesture of the object, so as to be detected by the photo-sensing unit 23. It should be noted that the micro projector 26 may be rotatably coupled to one of the first and second substrates 21, 22, so that the position of the projected image is adjustable.

To sum up, by arranging the infrared sensors 231 of the photo-sensing unit 23 at positions corresponding to the black matrix 222 of the second substrate 22 and by the intrinsic properties of the black matrix 222 allowing transmission of infrared light, the infrared-light sensing function can be incorporated into the display of the present invention and the infrared sensors 231 can have relatively large layout areas while maintaining a relatively high aperture ratio. Moreover, sensitivity of the infrared sensors 231 is not adversely affected by ambient visible light or backlight owing to the black matrix 222 which blocks transmission of the visible light therethrough. Furthermore, the number and the layout areas of the infrared sensors 231 are adjustable based on the size of the display and the sensitivity requirement for the infrared detecting function of the display. Even further, by including the functional components such as the X-ray sensing unit and the micro projector 26, the display of the present invention can be incorporated with various functions, such as gesture-sensing/control, X-ray sensing/display, infrared thermal imaging, night vision display or the like, based on functional demands in various fields.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A display comprising:
    a first substrate including a plurality of scan lines arranged along a first direction, and a plurality of data lines arranged along a second direction and intersecting said scan lines, said first substrate having a plurality of pixel zones, each of said pixel zones being cooperatively defined by an adjacent two of said data lines and an adjacent two of said scan lines and being spaced apart from an adjacent one of said pixel zones by one of said scan lines or one of said data lines;
    a second substrate that is spaced apart from said first substrate and that includes a black matrix, said black matrix configuring said second substrate with a plurality of spaced-apart light-transmissible zones that respectively correspond in position to said pixel zones, that are non-overlapping with said scan lines and said data lines and that allow transmission of visible light therethrough, said black matrix being configured to allow transmission of infrared light therethrough and to block transmission of visible light therethrough;
    a photo-sensing unit that includes a plurality of infrared sensors and a plurality of first switches electrically coupled to said infrared sensors, said infrared sensors being disposed on said data lines or on said scan lines within a projection of said data lines or said scan lines of normal to a surface normal to a surface of said first substrate on which said scan lines and said data lines are disposed, and being disposed at a position corresponding to said black matrix of said second substrate, and being configured to receive infrared light which passes through said black matrix; and
    a backlight unit serving as a light source for image display;
    wherein said photo-sensing unit is excluded from being present in said pixel zones and is fully covered by said black matrix.

2. The display according to claim 1, wherein said second substrate includes a plurality of color filters disposed at said light-transmissible zones, each of said color filters being configured to allow transmission of one of red light, green light, and blue light therethrough.

3. The display according to claim 1, further comprising a light generating unit serving as a light source for detection by said photo-sensing unit.

4. The display according to claim 3, wherein said light generating unit is operable to generate infrared light.

5. The display according to claim 3, wherein said light generating unit includes an infrared-light source and a lens component.

6. The display according to claim 1, further comprising a micro-projector that is coupled to one of said first and second substrates and that is operable for projecting images.

7. The display according to claim 6, wherein said microprojector is rotatably coupled to said one of said first and second substrates.

8. The display according to claim 1, wherein said backlight unit includes a light guide plate and a backlight source that is operatively associated with said light guide plate and that is selected from the group consisting of a white light emitting diode (LED), a red LED, a green LED, a blue LED, and a far infrared LED.

9. The display according to claim 1, wherein said first substrate includes a plurality of second switches, each of which is associated with a respective one of said pixel zones to control an applied voltage to the respective one of said pixel zones.

10. The display according to claim 9, wherein said first switch and said second switches are independently one of an indium-gallium-zinc-oxide transistor, a poly-silicon transistor and an amorphous silicon transistor.

11. The display according to claim 1, wherein each of said infrared sensors is a photodiode made of a material selected from the group consisting of an amorphous silicon semiconductor material, a micro-crystalline silicon semiconductor material, a polycrystalline silicon semiconductor material, an organic material having a band gap less than 1.12 eV, and an inorganic material having a band gap less than 1.12 eV.

12. The display according to claim 1, wherein said photosensing unit further includes an amplifier operable for adjusting an output current of a corresponding one of said infrared sensors.

13. The display according to claim 1, wherein said display is configured as one of a liquid crystal display, an organic light-emitting diode display, and an electro-wetting display.

14. The display according to claim 2, further comprising an X-ray sensing unit that is coupled to said first substrate, that corresponds in position to said color filters that allow transmission of green light, and that includes a plurality of scintillators operable to convert X-ray light into visible light, and a plurality of thin-film transistors operable to convert the visible light from said scintillators into electrical signals.

* * * * *